Patented Nov. 13, 1951

2,575,314

UNITED STATES PATENT OFFICE 2,575,314

PROCESS FOR RECOVERY OF CARBAZOLE

Paulus H. de Bruijn, Geleen, Netherlands, assignor to De Directie van de Staatsmijnen in Limburg, Heerlen, Netherlands No Drawing. Application June 5, 1950, Serial No. 166,289. In the Netherlands July 8, 1949

11 Claims. (Cl. 260—318)

This invention relates to the recovery of carbazole from carbazole sulfate or mixtures containing carbazole sulfate as a principal ingredient by decomposition of the carbazole sulfate with water.

FIELD OF INVENTION

A principal source of carbazole is coal tar fractions, particularly the so called anthracene cut, from which carbazole may be separated in the form of carbazole sulfate by treatment of the crude mixture with sulfuric acid. It is well known that carbazole may then be prepared by decomposing the resulting sulfate with water. In the known procedures, the carbazole sulfate is treated with an excess of water after which the resulting carbazole is separated from the dilute sulfuric acid by filtration. However, operation of this process in the past has always been accomplished with some difficulty, since the carbazole is liberated in a very finely divided state so that filtration can only be carried out with considerable difficulty.

OBJECTS

A principal object of this invention is the provision of a new process for the recovery of carbazole from carbazole sulfate.

Further objects include:

(1) The provision of a carbazole recovery process which eliminates a filtration step and in which the carbazole is separated from the sulfate decomposition mixture while in a dissolved form;

(2) The provision of carbazole recovery procedures which produce a product of very high purity, e. g., 98% or higher;

(3) The provision of such procedures which allow less water to be employed for the decomposition of the carbazole sulfate than has been customary in the procedures known heretofore, whereby sulfuric acid, obtained as a by-product, is relatively highly concentrated, permitting it to be used for treatment of other coal tar fractions;

(4) The provision of such procedures in which carbazole is obtained as a coarse-grained product which can be very easily filtered if this is desired in subsequent treatments.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished, according to the present invention, by decomposing carbazole sulfate, or equivalent materials comprising mixtures containing carbazole sulfate as a major ingredient, with water in the presence of a water immiscible, organic solvent for carbazole, so that the carbazole liberated by the water decomposition is dissolved in the solvent and then separating the resulting organic solution of carbazole from the aqueous sulfuric acid solution produced as a by-product of the reaction. The solution of carbazole and the sulfuric acid solution are immiscible and the carbazole solution can be separated, such as by decantation. Preferably, the mixture, subsequent to the water decomposition step, is heated to or near to the boiling point of the organic solvent, so as to hasten the solution of the carbazole and the carbazole is separated from the solution by cooling the solution and crystallizing out the carbazole.

The success of the present invention depends, to a large extent, upon the discovery that carbazole sulfate may be decomposed by water to yield carbazole in the presence of an organic, immiscible solvent without detriment to the decomposition reaction and without any substantial sulfonation of the reactants. As a result, the carbazole formed in the decomposition step can be immediately dissolved and, it has been found that the resulting solution is easily separated from the aqueous sulfuric acid. The resulting carbazole, after separation from the organic solvent, such as by evaporation and crystallization, is of unusually high purity. Moreover, much less water than generally used heretofore can be used for the decomposition of the sulfate, so that a relatively concentrated sulfuric acid is obtained as a by-product which can be usefully employed for the treatment of other coal tar products, thus providing considerable saving in reagents.

A more complete understanding of the procedures of this invention may be had by reference to the following example which illustrates the operation of the process on one particular type of carbazole sulfate containing mixture.

Example

A pasty mass consisting of carbazole sulfate and sulfuric acid is obtained by treating 150 parts by weight of crude anthracene (44.5% anthracene and 40.5% carbazole, the remainder consisting of phenanthrene, etc.) dissolved in benzene, with 180 parts by weight of 90% sulfuric acid.

The pasty mass is stirred into 1500 parts by weight of benzene at about 20° C. and 45 parts by weight of water are added. After the water is added, stirring is continued for 30 minutes, while the temperature is raised to 80-85° C. and a limpid solution of carbazole in benzene is obtained over a layer of 72% sulfuric acid which is easily separated by decantation.

By cooling the hot carbazole solution after it is separated and all acid has been washed out of it, 49 parts by weight of carbazole in the form of white crystals (carbazole content 98.5%; melting point 241° C.) are obtained from the said solution.

After the solvent has been removed by means of distillation, an additional 9.5 parts by weight of carbazole, having a purity of 90%, are obtained from the mother liquor.

DETAILED DESCRIPTION

The above example illustrates the use of benzene as the water-immiscible solvent for use in the process. However, substantially any other water-immiscible organic liquid, which is normally liquid and is a solvent for carbazole, can be employed. Preferred solvents include normally liquid hydrocarbons, such as benzene, toluene, xylene, hexane, cyclohexane; chlorinated hydrocarbons, such as chlorobenzene, trichloroethylene, ethers, such as diethyl ether, diamyl ether, and the like. If the process is employed in conjunction with a procedure for obtaining carbazole sulfate from crude anthracene, preferably the same solvent is employed as has been used for dissolving the crude anthracene.

The quantity of solvent employed in the process is not critical. Obviously, sufficient amount of the solvent is used to enable all of the carbazole formed in the reaction to be dissolved at the highest temperature encountered during the process. On the other hand, it is of advantage not to use any substantial excess of solvent, so that the carbazole may be obtained by cooling the heated solution in the fashion described herein.

The above example illustrates the use of the process in conjunction with a mixture containing carbazole sulfate as a principal ingredient along with minor amounts of impurities. A noteworthy feature of the invention is the fact that it permits the carbazole to be separated from the accompanying impurities, thus providing a product of very high purity. The process is generally applicable to any type of mixture containing carbazole sulfate as a principal ingredient and, of course, is usable on a relatively high purity carbazole sulfate.

Water is the agent which is used for the decomposition of the carbazole sulfate. This may be added to the reaction mixture as such, or in the form of dilute sulfuric acid. When the water is added in the latter fashion, the process provides a unique way of increasing the strength of a dilute acid, since the concentration of the sulfuric acid is raised through the decomposition reaction. The water or dilute sulfuric acid should be added to the reaction mixture in sufficient quantity to form up to a 75% aqueous solution of sulfuric acid with the sulfuric acid of the carbazole sulfate. Preferably, however, the amount of water or dilute acid added is such as to form a 65 to 75% aqueous solution of sulfuric acid.

Various temperatures may be employed in carrying out the process, but preferably, the decomposition step should be conducted at a temperature at which sulfonation does not occur. Thus, it is preferable to begin the reaction at a temperature of about 20-30° C. Subsequent to the reaction of the water with the carbazole sulfate, the temperature of the mixture is preferably raised to or very near to the boiling point of the solvent used, in order to enable the recovery to be most rapidly accomplished. This raising of temperature is also of advantage since it permits the formation of a concentrated solution of carbazole to be obtained from which a large part of the dissolved carbazole can be crystallized out by cooling the heated solution to a temperature of about 20-30° C. The saturated solution, or any part thereof, remaining after the crystals have been removed, is preferably recycled in a further operation of the process for use as the solvent.

Any carbazole remaining in the solvent after cooling and crystallization can be recovered by evaporation or distillation. It has been found preferable, however, to recover the material by steam distillation, because this results in the formation of a coarse-grained product which can be very easily filtered.

The process according to the invention is of particular importance if the precipitate of sulfuric acid-containing carbazole sulfate, obtained by the process described in copending U. S. application Serial No. 172,128, filed July 5, 1950 (in which process the said precipitate adheres to the wall and the bottom of the reaction vessel), is used as starting material. Without removing the said precipitate from the reaction vessel, carbazole can be obtained therefrom in a simple manner, by first passing the solvent for the recovery operation into the reaction vessel and, subsequently, adding the necessary quantity of water or dilute sulfuric acid with stirring. In the meantime, the temperature, initially kept within the range from 20-30° C., is raised to about the boiling point of the resulting carbazole solution, even before the decomposition of the carbazole sulfate has been completed. During this operation, the sticky precipitate of barbazole sulfate changes into a limpid solution, while two layers are formed. The layer of sulfuric acid can easily be separated from the carbazole solution in a known manner. By adjusting the quantity of water, sulfuric acid may be obtained which is suitable for the preliminary cleaning of crude anthracene, since the concentration is sufficiently low to prevent losses due to the sulfonation of the solvent or of anthracene, phenanthrene, or carbazole, while also no carbazale sulfate is formed in this case.

I claim:

1. A process for the recovery of carbazole from carbazole sulfate which comprises decomposing the carbazole sulfate by adding water thereto in sufficient quantity to form up to a 75% aqueous solution of sulfuric acid with the sulfuric acid of the carbazole sulfate in the presence of a water-immiscible organic solvent for carbazole and separating the resulting organic solution of carbazole from the aqueous sulfuric acid solution.

2. A process for the recovery of carbazole from carbazole sulfate which comprises adding water at a temperature of 20° to 30° C. to carbazole sulfate in sufficient quantity to form 65 to 75% aqueous solution of sulfuric acid with the sulfuric acid of the carbazole sulfate in the presence of a water-immiscible, normally liquid solvent for carbazole, heating the resulting mixture to approximately the boiling point of said solvent, separating the resulting organic solution of carbazole from the aqueous sulfuric acid solution, and separating the carbazole from said organic solvent.

3. A process as claimed in claim 2, wherein said separation of carbazole from said organic solvent is accomplished by cooling the organic solution whereby dissolved carbazole is crystallized out and the crystallized product is filtered from the mother liquor.

4. A process as claimed in claim 3, wherein the mother liquor remaining after said filtration is used as the solvent for recovery of further quantities of carbazole in repetition of the process.

5. A process as claimed in claim 2, wherein said separation of carbazole from said organic solvent is accomplished by removing the solvent by steam distillation.

6. A process as claimed in claim 1, wherein said solvent is a normally liquid hydrocarbon.

7. A process as claimed in claim 6, wherein said hydrocarbon is benzene.

8. A process as claimed in claim 1, wherein said solvent is a chlorinated hydrocarbon.

9. A process as claimed in claim 8, wherein said chlorinated hydrocarbon is chlorobenzene.

10. A process as claimed in claim 1, wherein the carbazole sulfate is present as a mixture obtained from a coal tar fraction by treatment with concentrated sulfuric acid.

11. A process as claimed in claim 2, wherein said water is added to said carbazole in the form of dilute sulfuric acid.

PAULUS H. DE BRUIJN.

REFERENCES CITED

The following references are of record in the file of this patent:

UNITED STATES PATENTS

| Number | Name | Date |
| --- | --- | --- |
| 1,348,722 | Kirby | Aug. 3, 1920 |
| 2,242,842 | Weinmayr | May 20, 1941 |
| 2,459,135 | Rottschaefor | Jan. 11, 1949 |